United States Patent
Murakami et al.

(10) Patent No.: US 10,513,244 B2
(45) Date of Patent: Dec. 24, 2019

(54) VEHICLE CONTROL SYSTEM AND VEHICLE CONTROL DEVICE

(71) Applicant: TOYOTA JIDOSHA KABUSHIKI KAISHA, Toyota-shi, Aichi-ken (JP)

(72) Inventors: Hiroko Murakami, Toyota (JP); Tomoyuki Funayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 161 days.

(21) Appl. No.: 15/719,740

(22) Filed: Sep. 29, 2017

(65) Prior Publication Data

US 2018/0118163 A1    May 3, 2018

(30) Foreign Application Priority Data

Oct. 28, 2016 (JP) .................. 2016-211460

(51) Int. Cl.
| | |
|---|---|
| B60R 25/24 | (2013.01) |
| B60W 30/06 | (2006.01) |
| B60R 25/01 | (2013.01) |
| B60R 25/20 | (2013.01) |
| G05D 1/00 | (2006.01) |
| G07C 9/00 | (2006.01) |

(52) U.S. Cl.
CPC ............ B60R 25/24 (2013.01); B60R 25/01 (2013.01); B60R 25/209 (2013.01); B60W 30/06 (2013.01); G05D 1/0022 (2013.01); G07C 9/00 (2013.01); G07C 9/00309 (2013.01); B60R 2325/105 (2013.01); G07C 2009/00555 (2013.01); G07C 2009/00793 (2013.01); G07C 2209/63 (2013.01)

(58) Field of Classification Search
CPC ....... B60R 25/24; B60R 25/01; B60R 25/209; B60R 25/2072; G07C 9/00309; G07C 2009/00555; B60W 30/06; G05D 1/0022; G05D 1/028
USPC ...................................... 701/2, 36
See application file for complete search history.

(56) References Cited

U.S. PATENT DOCUMENTS

| | | | |
|---|---|---|---|
| 2003/0216124 A1 | 11/2003 | Emmerling et al. | |
| 2004/0207510 A1 | 10/2004 | Buchner | |
| 2012/0092129 A1* | 4/2012 | Lickfelt | B60R 25/24 340/5.72 |

(Continued)

FOREIGN PATENT DOCUMENTS

| | | |
|---|---|---|
| DE | 10221427 A1 | 12/2003 |
| JP | 2009-162027 A | 7/2009 |

(Continued)

*Primary Examiner* — Nadeem Odeh
(74) *Attorney, Agent, or Firm* — Oliff PLC

(57) ABSTRACT

A vehicle control system includes a first transmitter that transmits a predetermined first signal over a predetermined area, a first receiver and a second receiver that receive second and third signals, a detector that detects the field intensities of the received signals, a second transmitter that transmits a signal through an RF-band radio wave, and an electronic control unit that operates an in-vehicle device based on the third signal received by the first receiver and restrains or prohibits the in-vehicle device from being operated based on the third signal when the field intensity of the third signal is lower than the field intensity of the second signal by a value greater than a predetermined standard.

2 Claims, 8 Drawing Sheets

(56) References Cited

U.S. PATENT DOCUMENTS

2014/0222252 A1\* 8/2014 Matters ................ B62D 15/027
 701/2
2016/0148450 A1 5/2016 Ohshima

FOREIGN PATENT DOCUMENTS

| JP | 2015-001069 A | 1/2015 |
| --- | --- | --- |
| JP | 2015-001778 A | 1/2015 |
| JP | 2016-050409 A | 4/2016 |
| JP | 2016-097927 A | 5/2016 |
| JP | 2016-138377 A | 8/2016 |

\* cited by examiner

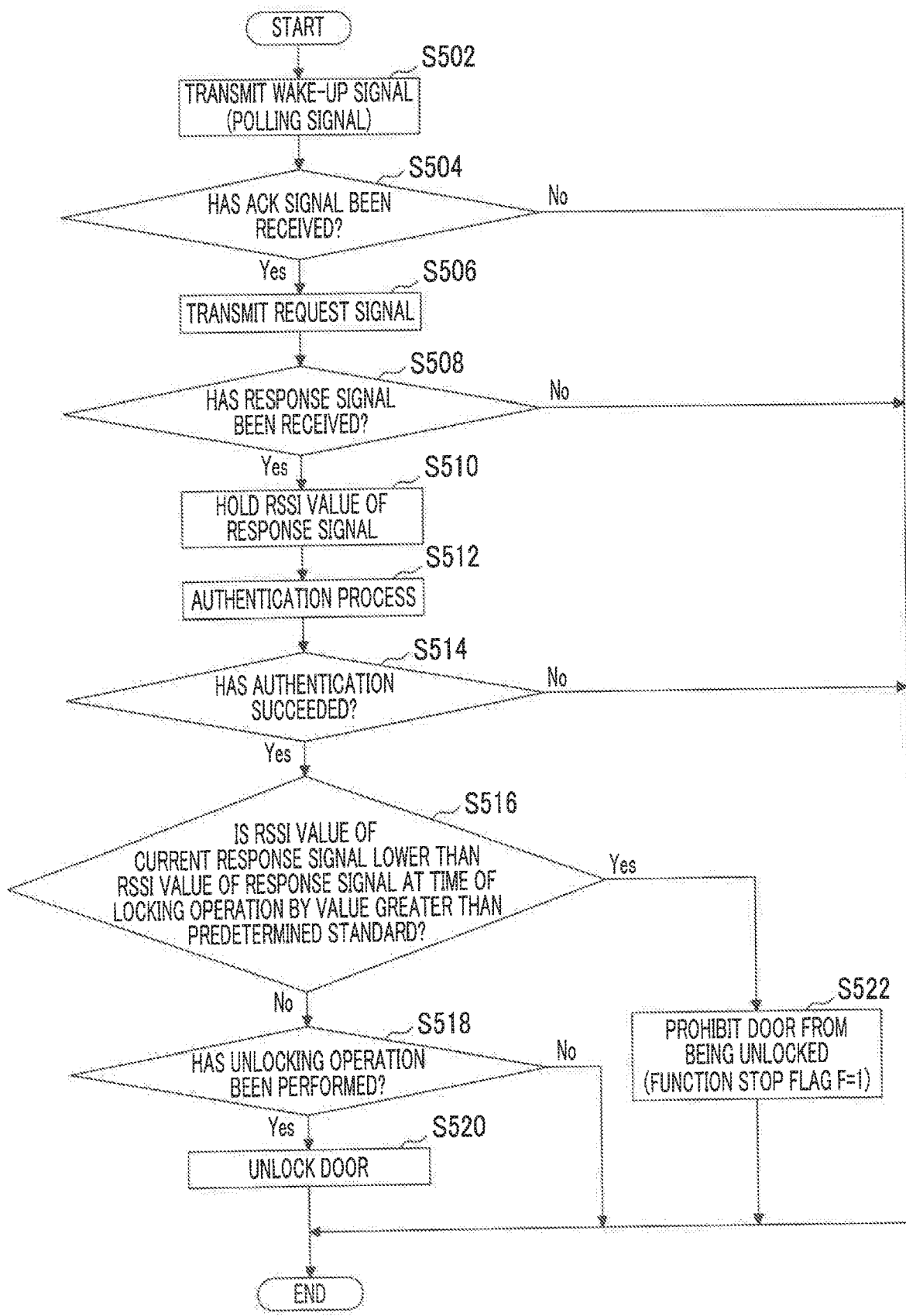

VEHICLE CONTROL SYSTEM AND VEHICLE CONTROL DEVICE

INCORPORATION BY REFERENCE

The disclosure of Japanese Patent Application No. 2016-211460 filed on Oct. 28, 2016 including the specification, drawings and abstract is incorporated herein by reference in its entirety.

BACKGROUND

1. Technical Field

The disclosure relates to a vehicle control system and vehicle control device.

2. Description of Related Art

In the related art, a technique of operating an in-vehicle device based on bidirectional communication between a portable device that transmits a signal (an RF signal) through an RF-band radio wave and a vehicle communicator that transmits a signal (an LF signal) through are LF-band radio wave has been known (for example, Japanese Unexamined Patent Application Publication. No. 2016-138377 (JP 2016-138377 A)).

For example, JP 2016-138377 A discloses a smart entry system in which a locking and unlocking device (a door lock motor or the like) of a vehicle is operated through bidirectional communication between the vehicle and a portable device such that a door of the vehicle is unlocked.

SUMMARY

Meanwhile, in a case where the field intensity of an RF signal that a vehicle communicator has received is somewhat low, there is a possibility that the distance between the portable device and the vehicle may be excessively great, and thus it is preferable to restrain or prohibit the in-vehicle device from being operated. When the distance between the user carrying the portable device and the vehicle becomes great, it becomes difficult to figure out the state of the vehicle and the situation around the vehicle. Therefore, in a case where it is determined that the distance between the portable device and the vehicle is excessively great based on the field intensity of the RF signal that the vehicle communicator has received, it is preferable to restrain or prohibit a vehicle driving device from being operated in view of safety or the like. In addition, for example, there is a vehicle theft method called "relay attack" in which a third party with malicious intent relays an LF signal, which is transmitted mainly to the vicinity of a vehicle, to a portable device that is positioned relatively far away from the vehicle (for example, a portable device that is in the house of the user) by using a repeater such that a door of the vehicle is unlocked or like. Therefore, in a case where it is determined that the distance between the portable device and the vehicle is excessively great based on the field intensity of the RF signal that the vehicle communicator has received, it is preferable to prohibit an unlocking device of the vehicle from being operated in view of preventing the vehicle theft or the like.

However, RF-band radio waves are likely to be influenced by the environment around a vehicle. For example, in a case where a vehicle is in a location with relatively few reflective objects, such as a wall and a ceiling, (for example, a large outdoor plane parking lot), direct waves are predominant in radio waves that are transmitted from a portable device and reach the vehicle. On the other hand, in a case where a vehicle is in a location with relatively many reflective objects, such as a wall and a ceiling, (for example, a self-propelled multi-storey car park), direct waves and reflected waves of an RF signal transmitted from a portable device reach the vehicle while being superimposed so that the field intensity of a received RF signal becomes great in comparison with a case where direct waves are predominant in radio waves that reach the vehicle. Accordingly, it is not possible to accurately figure out the positional relationship between a portable device and a vehicle by using only the absolute value of the field intensity of an RF signal that a vehicle communicator receives from the portable device, and thus there may be a case where it is not possible to appropriately restrain or prohibit an in-vehicle device from being operated.

The disclosure provides a vehicle control system or the like that can more appropriately restrain or prohibit an in-vehicle device from being operated based on the field intensity of an RF signal that a vehicle communicator receives from a portable device in a case where the in-vehicle device is operated based on bidirectional communication between a vehicle and the portable device.

An aspect of the disclosure relates to a vehicle control system in which an in-vehicle device installed in a vehicle is operated based on bidirectional communication between the vehicle and a portable device. The vehicle control system includes a first transmitter, a first receiver, a detector, a second receiver, a second transmitter, and an electronic control unit. The first transmitter is configured to transmit a predetermined first signal over a predetermined area outside a vehicle cabin through an LF-band radio wave, the first transmitter being provided in the vehicle. The first receiver is configured to receive a signal transmitted from the portable device through an RF-band radio wave, the first receiver being provided in the vehicle. A detector is configured to detect a field intensity of the signal received by the first receiver, the detector provided in the vehicle. A second receiver is configured to receive the signal transmitted from the vehicle through the LF-band radio wave, the second receiver provided in the portable device. A second transmitter is configured to transmit the signal to the vehicle through the RF-band radio wave, the second transmitter provided in the portable device. The second transmitter is configured to transmit a predetermined third signal to the vehicle through the RF-band radio wave after transmitting a predetermined second signal to the vehicle through the RF-band radio wave when the second receiver receives the first signal. The electronic control unit is configured to operate the in-vehicle device based on the third signal received by the first receiver, to determine whether a field intensity of the third signal detected by the detector is lower than a field intensity of the second signal detected by the detector by a value greater than a predetermined standard, and to restrain or prohibit the in-vehicle device from being operated based on the third signal when the electronic control unit determines that the field intensity of the third signal detected by the detector is lower than the field intensity of the second signal detected by the detector by a value greater than the predetermined standard, the electronic control unit provided in the vehicle.

According to the aspect, the vehicle (the first transmitter) transmits the LF signal (the first signal) over the predetermined area outside the vehicle cabin and the portable device (the second transmitter) having received the LF signal transmits the RF signal (the third signal) which is a trigger for operating the in-vehicle device to the vehicle after transmitting the RF signal (the second signal) to the vehicle. Since the wavelength of the LF-band radio wave is significantly long, the LF-band radio wave is less likely to be influenced by the environment around the vehicle than the RF-band radio wave and the reachable range (a range within which the portable device can receive the LF-band radio wave) thereof hardly varies. Therefore, the vehicle (the first transmitter) can transmit the LF signal such that the portable device can receive the LF signal within the predetermined area outside the vehicle cabin. Accordingly, the electronic control unit can use the field intensity detected by the detector of the second signal received by the vehicle (the first receiver) as a standard value of a field intensity pertaining to a case where the portable device is present in the predetermined area around the vehicle (in the vicinity of the vehicle). The electronic control unit may determine that the distance between the portable device and the vehicle is excessively great in a case where the field intensity detected by the detector of the third signal received by the vehicle (the first receiver) is lower than the field intensity of the second signal received by the vehicle (the first receiver) by a value greater than the predetermined standard. Therefore, the vehicle control system (the electronic control unit) can restrain or prohibit the in-vehicle device from being operated based on the third signal. In addition, when the field intensity of the third signal received by the vehicle (the first receiver) is compared with the field intensity of the second signal received by the vehicle (the first receiver) in a case where the portable device is present in the predetermined area around the vehicle (in the vicinity of the vehicle) instead of using the absolute value of the field intensity of the third signal received by the vehicle (the first receiver), it is possible to determine the position of the portable device with relatively high accuracy. Therefore, it is possible to more appropriately restrain or prohibit the in-vehicle device from being operated.

In the vehicle control system according to the aspect, the electronic control unit may be configured to control the first transmitter to transmit the first signal over the predetermined area outside the vehicle cabin through the LF-band radio wave when the first receiver receives a predetermined fourth signal transmitted from the portable device, to control the second transmitter to transmit the fourth signal to the vehicle through the RF-band radio wave when a first operation for starting a function of operating a vehicle driving device as the in-vehicle device is performed with respect to an operation unit of the portable device, to transmit the second signal to the vehicle through the RF-band radio wave when the second receiver receives the first signal, and to transmit the third signal to the vehicle through the RF-band radio wave when a second operation for operating the vehicle driving device is performed with respect to the operation unit after the second signal is transmitted to the vehicle; and to operate the vehicle driving device based on the third signal received by the first receiver such that the vehicle is moved by the vehicle driving device.

According to the aspect, a function is provided in which the portable device transmits the RF signal (the third signal) to the vehicle based on a user's operation (the second operation) and the vehicle (the electronic control unit) having received the third signal operates the vehicle driving device as the in-vehicle device such that the vehicle moves. At this time, before the third signal is transmitted, the portable device transmits the RF signal (the fourth signal) for activating the function to the vehicle based on a user's operation (the first operation) and after the vehicle receives the fourth signal, the vehicle (the first transmitter) transmits the first signal to the portable device. Therefore, the vehicle can transmit the first signal to the portable device and receive the second signal from the portable device present in the predetermined area around the vehicle (in the vicinity of the vehicle) when receiving a signal from the portable device that requests activation of a function of operating the vehicle driving device. Therefore, it is possible for the vehicle control system (the electronic control unit) to determine that the distance between the portable device and the vehicle is excessively great and to restrain or prohibit the vehicle driving device from being operated in a case where the field intensity of the third signal for operating the vehicle driving device that is received from the portable device is lower than the field intensity of the received second signal by a value greater than the predetermined standard. Accordingly, in a case where it is difficult for the user to figure out the state of the vehicle and the situation around the vehicle since the user carrying the portable device has moved to a position relatively distant from the vehicle, the vehicle driving device is restrained or prohibited from being operated such that the vehicle is stopped or decelerated, and thus safety can be improved.

In the vehicle control system according to the aspect, the electronic control unit may be configured to control the first transmitter to transmit the first signal over the predetermined area outside the vehicle cabin through the LF-band radio wave when a door locking operation is performed with respect to a locking operation unit provided outside the vehicle cabin of the vehicle when the door of the vehicle is closed while being in an unlocked state with the vehicle being in an ignition-off state and to transmit a predetermined fifth signal over the predetermined area outside the vehicle cabin through the LF-band radio wave when a door unlocking operation is performed with respect to an unlocking operation unit provided outside the vehicle cabin of the vehicle or each time a predetermined time period elapses when the ignition-off state continues with the door being locked after the first signal is transmitted over the predetermined area, to control second transmitter to transmit the second signal to the vehicle through the RF-band radio wave when the second receiver receives the first signal and to transmit the third signal to the vehicle through the RF-band radio wave based on the fifth signal received by the second receiver after the second signal is transmitted to the vehicle. The electronic control unit may be configured to operate an unlocking device as the in-vehicle device based on the third signal received by the first receiver such that the door is unlocked, and to prohibit the unlocking device from being operated based on the third signal in a case where the electronic control unit determines that the field intensity of the third signal detected by the detector is lower than the field intensity of the second signal detected by the detector by a value greater than the predetermined standard.

According to the aspect, a function (a smart entry function) is provided in which the portable device having received the LF signal (the fifth signal) transmitted from the vehicle transmits the RF signal (the third signal) to the vehicle and the vehicle (the electronic control unit) having received the third signal operates the unlocking device as the in-vehicle device such that a door of the vehicle is unlocked. At this time, the vehicle and the portable device communicate the first signal and the second signal when the parked vehicle is locked (in a case where a locking operation with respect to the locking operation unit is performed). Accordingly, the vehicle can receive the second signal from the portable device present in the predetermined area around the vehicle (in the vicinity of the vehicle). Therefore, it is possible for the vehicle control system (the electronic control unit) to more appropriately determine that the distance between the portable device and the vehicle is excessively great and to prohibit the unlocking device from being operated in a case where the field intensity of the third signal for operating the unlocking device that is received from the portable device is lower than the field intensity of the received second signal by a value greater than the predetermined standard. Accordingly, in a case where there is a relay attack in which a third party with malicious intent relays the LF signal (the fifth signal) to the portable device that is positioned relatively far away from the vehicle by using a repeater, the unlocking device in the vehicle is prohibited from being operated, and thus it is possible to suppress a vehicle theft through the relay attack.

In the vehicle control system according to the aspect, the first signal may be a request signal with respect to the portable device, the second signal may be a response signal with respect to the first signal, and the third signal may be a moving operation signal which is a trigger for performing a remote parking function.

In the vehicle control system according to the aspect, the fourth signal may be an activation signal that requests the vehicle to activate a remote parking function, the first signal may be a request signal with respect to the portable device, the second signal may be a response signal with respect to the vehicle, and the third signal may be a moving operation signal which is a trigger for performing the remote parking function.

In the vehicle control system according to the aspect, the first signal and the fifth signal may be wake-up signals with respect to the portable device, the second signal may be an acknowledge signal with respect to the vehicle, and the third signal may be a response signal with respect to the vehicle.

Another aspect of the disclosure relates to a vehicle control device which is provided in a vehicle and operates an in-vehicle device installed in the vehicle based on bidirectional communication between the vehicle and a portable device. The vehicle control device includes a first transmitter, a first receiver, a detector, and an electronic control unit. The first transmitter is configured to transmit a predetermined first signal over a predetermined area outside a vehicle cabin through an LF-band radio wave. The first receiver is configured to receive a predetermined second signal transmitted from the portable device having received the first signal through an RF-band radio wave and to receive a predetermined third signal transmitted from the portable device through the RF-band radio wave after the second signal is transmitted. The detector is configured to detect a field intensity of the signal received by the first receiver. The electronic control unit is configured to operate the in-vehicle device based on the third signal received by the first receiver, to determine whether the field intensity of the third signal detected by the detector is lower than the field intensity of the second signal detected by the detector by a value greater than a predetermined standard based on the third signal received by the first receiver, and to restrain or prohibit the in-vehicle device from being operated based on the third signal in a case where the electronic control unit determines that the field intensity of the third signal detected by the detector is lower than the field intensity of the second signal detected by the detector by a value greater than the predetermined standard.

According to the aspects, it is possible to provide a vehicle control system or the like that can more appropriately restrain or prohibit an in-vehicle device from being operated based on the field intensity of an RF signal that a vehicle communicator receives from a portable device in a case where the in-vehicle device is operated based on bidirectional communication between a vehicle and the portable device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a flowchart schematically illustrating an example of a process corresponding to a smart unlocking function that is performed by the collation ECU.

DETAILED DESCRIPTION OF EMBODIMENTS

Hereinafter, embodiments of the disclosure will be described with reference to drawings.

Figure 1:
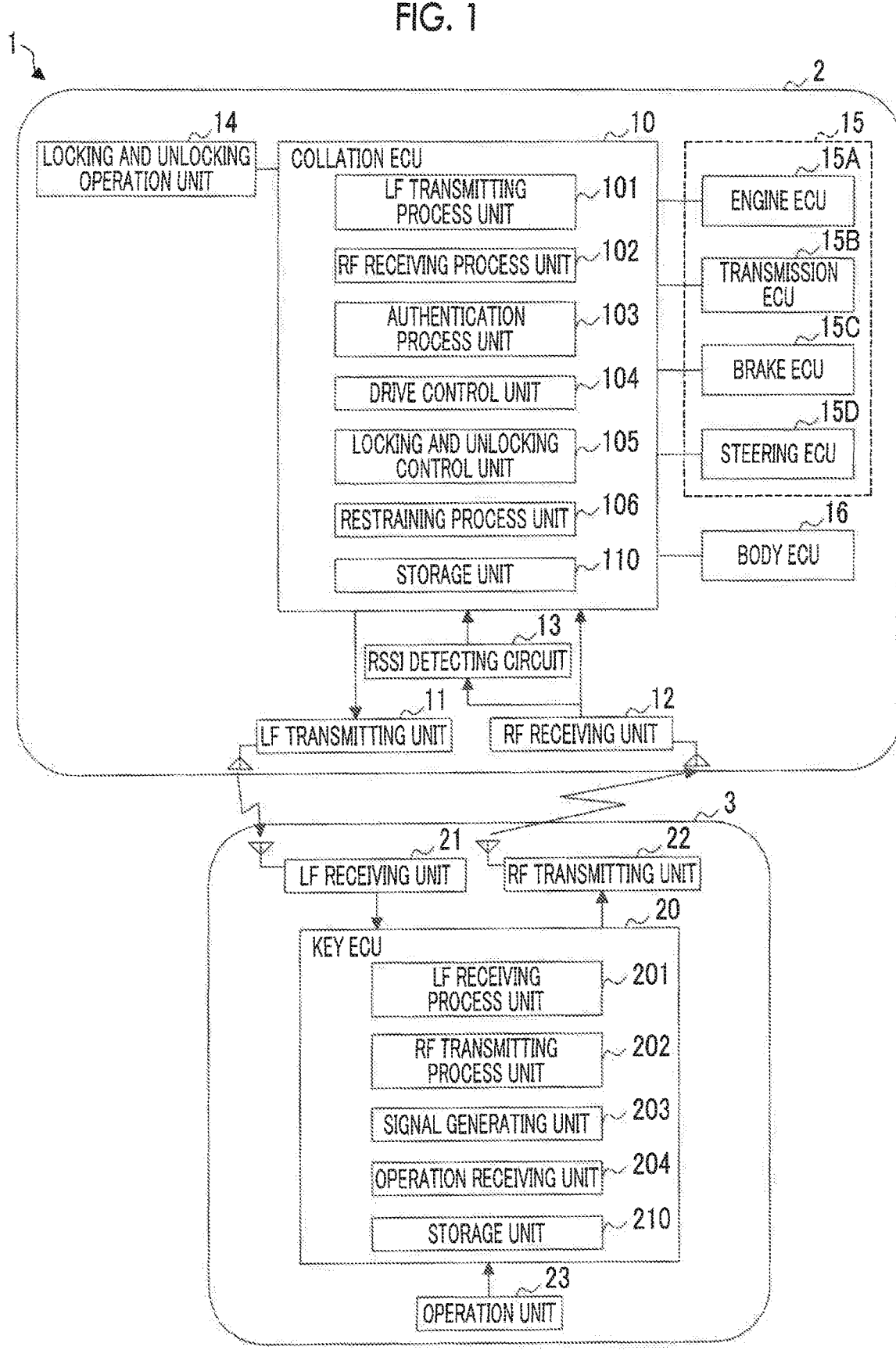
FIG. 1 is a block diagram schematically illustrating an example of the configuration of an electronic key system.

FIG. 1 is a block diagram schematically illustrating an example of the configuration of an electronic key system 1 (an example of a vehicle control system) according to an embodiment. In the electronic key system 1, an in-vehicle device is operated based on bidirectional communication between a vehicle 2 and a user-portable electronic key 3 (an example of a portable device) that is registered in the vehicle 2 (a collation ECU 10 which will be described later) in advance. For example, the electronic key system 1 realizes a remote parking function in which a vehicle driving device 15 (which will be described later) is operated based on bidirectional communication between the vehicle 2 and the electronic key 3 such that the vehicle 2 moves and is parked at a predetermined position when a user on the outside of the vehicle 2 performs a predetermined operation with respect to the electronic key 3. In addition, the electronic key system 1 realizes a smart entry function in which a locking and unlocking device (a body ECU 16 which will be described later) is operated based on bidirectional communication between the vehicle 2 and the electronic key 3 such that a door is locked or unlocked when a user carrying the electronic key 3 performs an operation such as an operation of touching a door handle (a locking and unlocking operation unit 14 which will be described later). Hereinafter, a function related to a door locking operation that is a portion of the smart entry function will be referred to as a smart locking function and a function related to a door unlocking operation will be referred to as a smart unlocking function.

In the following description, an expression "ignition-on (IG-ON) of the vehicle 2" means activation of the vehicle 2 and the meaning thereof includes the starting-up of an engine of an engined vehicle and activation (turning on) of a high-voltage power supply (a power supply for a drive motor) in an electric vehicle (a hybrid vehicle, a range extender vehicle, or the like). In addition, an expression "ignition-off (IG-OFF) of the vehicle 2" means stoppage of the vehicle 2 and the meaning thereof includes stoppage of an engine of an engined vehicle and stoppage (turning off) of a high-voltage power supply in an electric vehicle. In the present embodiment, the description will be made on an assumption that the vehicle 2 is an engined vehicle.

The vehicle 2 includes the collation electronic control unit (ECU) 10, LF transmitting units 11, an RF receiving unit 12, a received signal strength indicator (RSSI) detecting circuit 13, the locking and unlocking operation unit 14, the vehicle driving device 15, and the body ECU 16.

The collation ECU 10 (an example of a vehicle control device) is an electronic control unit that performs various control processes for realizing the remote parking function and the smart entry function. The function of each of various ECUs according to the present embodiment including the collation ECU 10 (an engine ECU 15A, a transmission ECU 15B, a brake ECU 15C, a steering ECU 15D, the body ECU 16, a key ECU 20, and the like) may be realized by arbitrary hardware, software, or a combination thereof. Hereinafter, the description will be made on an assumption that a main unit of each of the various ECUs is a microcomputer which includes a CPU, a RAM, a ROM, an I/O, and the like.

The collation ECU 10 includes an LF transmitting process unit 101, an RF receiving process unit 102, an authentication process unit 103, a drive control unit 104, a locking and unlocking control unit 105, and a restraining process unit 106 which are functional units realized when one or more programs stored in the ROM is executed. In addition, the collation ECU 10 includes a storage unit 110 as a storage region that is defined as a nonvolatile internal memory, such as an electrically erasable programmable read-only memory (EEPROM).

Figure 2:
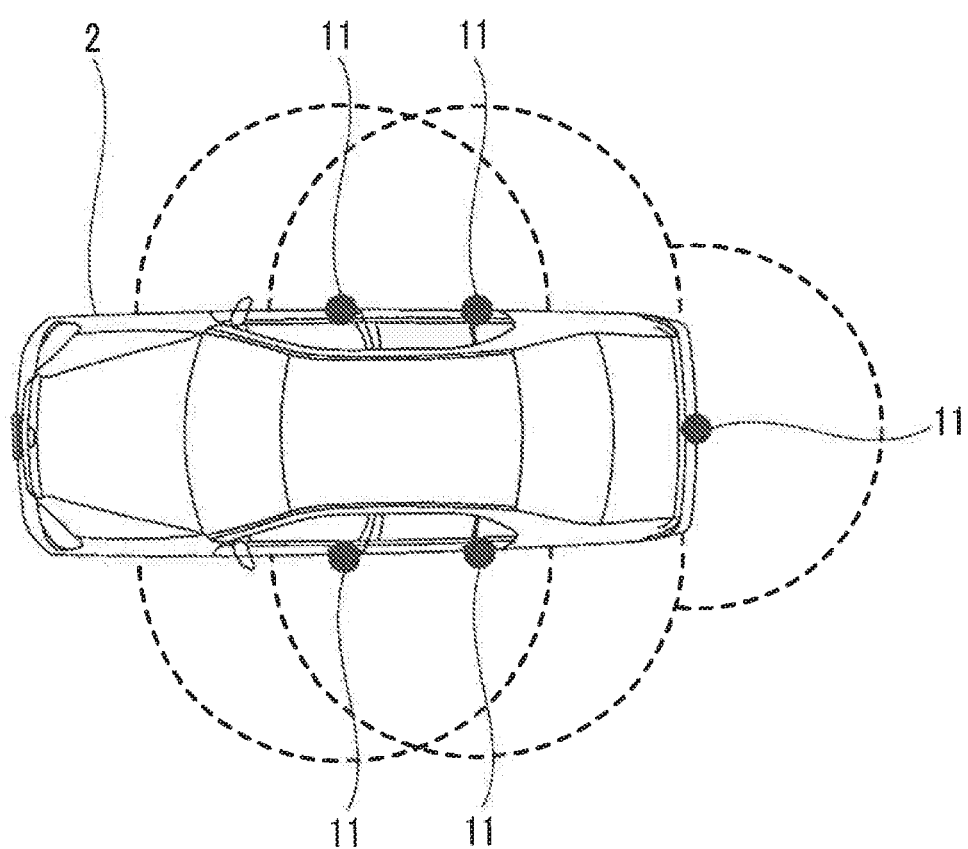
FIG. 2 is a view illustrating an example of the reachable range of an LF signal that is transmitted to the outside of a vehicle cabin from an LF transmitting unit.

The LF transmitting process unit 101 controls each LF transmitting unit 11 (an example of a first transmitter) to perform a process of transmitting a signal over a predetermined area outside a vehicle cabin at such a transmission intensity that allows the electronic key 3 to receive the signal through an LF-band radio wave (a radio wave of which the frequency is 30 kHz to 300 kHz). Hereafter, "transmission of a signal over the predetermined area outside the vehicle cabin at such a transmission intensity that allows the electronic key 3 to receive the signal" may be simply described as "transmission of a signal over the predetermined area outside the vehicle cabin". For example, FIG. 2 illustrates an example of the reachable range of an LF-band radio wave transmitted from the LF transmitting unit 11 (a range within which the electronic key 3 can receive the LF-band radio wave). In the example illustrated in FIG. 2, under control of the LF transmitting process unit 101, each LF transmitting unit 11 transmits a signal over an area around each LF transmitting unit 11 of which the radius is approximately 1 m and which is on the outside of the vehicle cabin (an area inward of a dotted line in FIG. 2) through an LF-band radio wave which the electronic key 3 can receive. Since the wavelength of the LF-band radio wave is very long, the LF-band radio wave is less likely to be influenced by the environment around the vehicle 2 (for example, presence or absence of reflective objects) than an RF-band radio wave (which will be described later) and the reachable range of the LF-band radio wave (a range within which the electronic key 3 can receive the LF-band radio wave) hardly varies. Therefore, the LF transmitting process unit 101 can adjust the output of the LF transmitting unit 11 such that the electronic key 3 can receive a signal transmitted from the LF transmitting unit 11 through the LF-band radio wave within the predetermined area outside the vehicle cabin.

The LF transmitting process unit 101 periodically (each time a predetermined time period elapses) transmits a wake-up signal (a polling signal) with respect to the electronic key 3 on the outside of the vehicle cabin through the LF transmitting unit 11 at a predetermined time, for example, when the vehicle 2 is in an ignition-off (IG-OFF) state. In addition, for example, in a case where a predetermined operation (a locking operation or an unlocking operation) with respect to the locking and unlocking operation unit 14 is performed, the LF transmitting process unit 101 transmits the wake-up signal with respect to the electronic key 3 on the outside of the vehicle cabin through the LF transmitting unit 11. In addition, for example, the IT transmitting process unit 101 transmits a request signal with respect to the electronic key 3 through the LF transmitting unit 11 in response to a transmission request from the authentication process unit 103. In addition, for example, the LF transmitting process unit 101 transmits an activation complete signal with respect to the electronic key 3 through the LF transmitting unit 11 in response to the transmission request from the authentication process unit 103. Hereinafter, various signals transmitted through the LF-band radio wave will be collectively referred to as an LF signal.

The wake-up signal is a signal that wakes up the electronic key 3 in which functions other than a function of receiving the LF signal transmitted from the vehicle 2 are in a sleep state.

The RF receiving process unit 102 controls the RF receiving unit 12 (an example of a first receiver) to perform a process of receiving the RF-band radio wave (for example, a radio wave of which the frequency is 30 MHz to 3 GHz). For example, the RF receiving process unit 102 receives an acknowledge (ACK) signal transmitted from the electronic key 3 having received the wake-up signal. In addition, for example, the RF receiving process unit 102 receives a response signal transmitted from the electronic key 3 having received the request signal (a challenge signal). In addition, the RF receiving process unit 102 receives an activation signal transmitted from the electronic key 3. In addition, the RF receiving process unit 102 receives a termination signal transmitted from the electronic key 3. Hereinafter, various signals transmitted through the RF-band radio wave will be collectively referred to as an RF signal.

The activation signal is a signal that is transmitted from the electronic key 3 and that requests the vehicle 2 to activate the remote parking function. In addition, the termination signal is a signal that is transmitted from the electronic key 3 and notifies the vehicle 2 that the remote parking function is to be terminated.

The authentication process unit 103 performs an authentication process of the electronic key 3 based on a "response" or the like with identification information unique to the electronic key 3 that is included in the response signal received by the RF receiving process unit 102. Examples of the identification information include an identification (ID) which is an identifier unique to the electronic key 3 and a cryptographic key unique to the electronic key 3. As a method for authentication of the electronic key 3, an arbitrary method, such as ID collation and challenge-response authentication, or a combination thereof can be used. In the case of the ID collation, the authentication process unit 103 collates an ID included in the response signal that the RF receiving process unit 102 receives with master ID previously registered (stored) in the storage unit 110 and the electronic key 3 is authenticated (authentication success) when the IDs coincide with each other. In addition, in the case of the challenge-response authentication, the authentication process unit 103 generates a cryptographic code (called "challenge") that can be decrypted by the cryptographic key unique to the electronic key 3 and transmits the transmission request to the LF transmitting process unit 101. Accordingly, the LF transmitting process unit 101 transmits the request signal (the challenge signal) including the "challenge" to the electronic key 3 through the LF transmitting unit 11. In addition, when the electronic key 3 receives the challenge signal, the electronic key 3 transmits the response signal (called "response") to the vehicle 2, the response signal including the result of decryption of the cryptographic code included in the challenge signal that is performed by using the cryptographic key. Then, the authentication process unit 103 collates the result of decryption of the "challenge" that is performed by using the cryptographic key (a master cryptographic key) unique to the electronic key 3 that is previously registered (stored) in the storage unit 110 with the "response" and the electronic key 3 is authenticated (authentication success) when the result of the decryption and the "response" coincide with each other.

The drive control unit 104 (an example of an electronic control unit) realizes the remote parking function based on the result of the authentication of the electronic key 3 which is performed by the authentication process unit 103, the remote parking function being activated when the RF receiving process unit 102 receives the activation signal. That is, the drive control unit 104 controls the vehicle driving device 15 based on a moving operation signal that is transmitted from the electronic key 3 authenticated by the authentication process unit 103 and is received by the RF receiving process unit 102 such that the vehicle 2 moves to a predetermined parking position. Specifically, the drive control unit 104 controls the driving force, the braking force, and the traveling direction of the vehicle 2 through the vehicle driving device 15 such that the vehicle 2 moves to the predetermined parking position. For example, in a case where the RF receiving process unit 102 continuously receives the moving operation signal, the drive control unit 104 controls the vehicle driving device 15 such that the vehicle 2 moves straight forward or rearward and the vehicle 2 moves to the parking position that is immediately ahead or immediately behind the vehicle 2. In addition, the drive control unit 104 may control the traveling direction of the vehicle 2 based on the result of detection performed by various sensors (not shown) that detect an obstacle in the vicinity of the vehicle 2 such that a certain distance is secured between the vehicle 2 and an obstacle (for example, a parked vehicle) adjacent to a parking space.

Even in a case where the RF receiving process unit 102 continuously receives the moving operation signal, the drive control unit 104 stops the vehicle 2 when it is determined that an obstacle is present immediately ahead or immediately behind the vehicle 2 based on the result of the detection performed by the various sensors.

The locking and unlocking control unit 105 (another example of the electronic control unit) performs control to realize the smart entry function based on the result of the authentication of the electronic key 3 which is performed by the authentication process unit 103. For example, in a case where a locking operation or an unlocking operation is performed with respect to the locking and unlocking operation unit 14 and the authentication of the electronic key 3 which is performed by the authentication process unit 103 succeeds, the locking and unlocking control unit 105 outputs a locking request or an unlocking request for a door of the vehicle 2 to the body ECU 16. When the body ECU 16 receives the locking request or the unlocking request, the body ECU 16 controls a door lock motor (not shown) such that the door of the vehicle 2 is locked or unlocked.

The restraining process unit 106 (still another example of the electronic control unit) restrains or prohibits the remote parking function in a case where a signal from the electronic key 3 that serves as a trigger for performing the remote parking function, that is, the moving operation signal, is transmitted from a position relatively far away from the vehicle 2. In a case where the distance between a user carrying the electronic key 3 and the vehicle 2 is excessively great, it is difficult for the user to figure out the state of the vehicle 2 and the situation around the vehicle 2 and it is preferable to restrain or prohibit the vehicle 2 from moving in view of safety. In addition, the restraining process unit 106 prohibits the smart entry function in a case where signals from the electronic key 3 that function as a trigger for performing the smart entry function, that is, the ACK signal and the response signal, are transmitted from a position relatively far away from the vehicle 2. This is because the smart entry function is realized when a user carrying the electronic key 3 is present within the predetermined area around the vehicle 2 (the reachable range of the LF signal) and the ACK signal and the response signal being transmitted from a position far away from the vehicle 2 indicate a high possibility of the relay attack. Specifically, the restraining process unit 106 restrains or prohibits the remote parking function based on the RSSI value of the moving operation signal from the electronic key 3. In addition, the restraining process unit 106 prohibits the smart entry function based on the RSSI value of the ACK signal or the response signal from the electronic key 3. The details of a process performed by the restraining process unit 106 will be described later.

Each LF transmitting unit 11 includes a transmission antenna and transmits the LF signal through the LF-band radio wave under control of the collation ECU 10 (the LF transmitting process unit 101). For example, as illustrated in FIG. 2, the LF transmitting unit 11 is installed in a door handle or the like on each of the doors (including a luggage compartment door, such as a trunk lid) of the vehicle 2. In the example illustrated in FIG. 2, five LF transmitting units 11 are provided in total to respectively correspond to four doors for boarding and a luggage compartment door with which the vehicle 2 is provided.

The RF receiving unit 12 includes a reception antenna and receives the RF-band radio wave (a signal) under control of the collation ECU 10 (the RF receiving process unit 102).

The RSSI detecting circuit 13 (an example of a detector) detects the field intensity (the RSSI value) of the RF-band radio wave (the RF signal) received by the RF receiving unit 12 and transmits a detection signal to the collation ECU 10.

The locking and unlocking operation unit 14 (an example of a locking operation unit and an unlocking operation unit) receives an operation input (for example, a contact operation or a touch operation) from the user of the vehicle 2 that is for locking and unlocking a door, the locking and unlocking operation unit 14 being provided in a door handle of the vehicle 2, for example. The locking and unlocking operation unit 14 is connected to the collation ECU 10 through a one-to-one communication cable or an intra-vehicle network, such as a controller area network (CAN) such that the locking and unlocking operation unit 14 can communicate with the collation ECU 10. A signal related to the operation state of the locking and unlocking operation unit 14 is transmitted to the collation ECU 10.

The locking operation and the unlocking operation may be performed with respect to operation units which are provided separately from each other.

The vehicle driving device 15 controls the driving force, the braking force, and the traveling direction of the vehicle 2 such that the vehicle 2 travels (moves) in a desired traveling state. For example, the vehicle driving device 15 controls the output of an engine (not shown), the shift position of a transmission (not shown), or the like to control the driving force of the vehicle 2. In addition, for example, the vehicle driving device 15 controls a brake device (not shown) to control the braking force of the vehicle 2. In addition, for example, the vehicle driving device 15 controls an electric power steering device to control the traveling direction of the vehicle 2. The vehicle driving device 15 includes the engine ECU 15A, the transmission ECU 15B, the brake ECU 15C, and the steering ECU 15D. The engine ECU 15A, the transmission ECU 15B, the brake ECU 15C and the steering ECU 15D are connected to the collation ECU 10 through the intra-vehicle network, such as a CAN such that the engine ECU 15A, the transmission ECU 15B, the brake ECU 15C and the steering ECU 15D can communicate with the collation ECU 10 and receive various control signals from the collation ECU 10.

The engine ECU 15A is an electronic control unit that controls the engine. Specifically, the engine ECU 15A controls an engine starting device (not shown), an ignition device (not shown), a fuel injecting device (not shown), and the like.

The transmission ECU 15B is an electronic control unit that controls the transmission. Specifically, the transmission ECU 15B outputs a control signal to a solenoid valve in a valve body that realizes a shift position selected from a plurality of predetermined shift positions.

The brake ECU 15C is an electronic control unit that controls the brake device. Specifically, the brake ECU 15C controls an electric pump or the solenoid valve of a brake actuator that outputs brake pressure (wheel cylinder pressure) to the brake device.

The steering ECU 15D is an electronic control unit that controls the electric power steering device. Specifically, the steering ECU 151) controls an assist motor of the electric power steering device to control the steering angle of the electric power steering device.

The body ECU 16 (an example of the unlocking device) is an electronic control unit that controls an actuator (for example, a door lock motor) for locking and unlocking a door of the vehicle 2. The body ECU 16 is connected to the collation ECU 10 through the intra-vehicle network, such as a CAN such that the body ECU 16 can communicate with the collation ECU 10 and receives various control signals from the collation ECU 10.

The electronic key 3 (an example of the portable device) includes the key ECU 20, an LF receiving unit 21, an RF transmitting unit 22, and an operation unit 23.

The key ECU 20 is an electronic control unit that performs a control process for realizing various functions of the electronic key 3. The key ECU 20 includes an LF receiving process unit 201, an RF transmitting process unit 202, a signal generating unit 203, and an operation receiving unit 204 which are functional units realized when one or more programs are executed in the CPU. In addition, the key ECU 20 includes a storage unit 210 as a storage region that is defined as a nonvolatile internal memory, such as an electrically erasable programmable read-only memory (EEPROM).

The LF receiving process unit 201 controls the LF receiving unit 21 (an example of a second receiver) to perform a process of receiving the LF-band radio wave (the LF signal). For example, the LF receiving process unit 201 receives the wake-up signal, the request signal, the activation complete signal, and the like transmitted from the vehicle 2.

The key ECU 20 is usually in a sleep state in which functions other than a function of receiving the LF-band radio wave (that is, the LF receiving process unit 201) are stopped and the wake-up signal received by the LF receiving process unit 201 wakes up the functions other than the function of receiving the LF-band radio wave.

The RF transmitting process unit 202 controls the RF transmitting unit 22 (an example of a second transmitter) to perform a process of transmitting the RF-band radio wave (the RF signal). For example, the RF transmitting process unit 202 transmits the ACK signal to the vehicle 2 in response to a transmission request from the signal generating unit 203. In addition, for example, the RF transmitting process unit 202 transmits the response signal to the vehicle 2 in response to the transmission request from the signal generating unit 203.

The signal generating unit 203 generates various signals to be transmitted to the vehicle 2 when the LF receiving process unit 201 receives various signals from the vehicle 2 or the operation receiving unit 204 receives an operation input through the operation unit 23. For example, in a case where the LF receiving process unit 201 receives the wake-up signal transmitted from the vehicle 2, the signal generating unit 203 generates the ACK signal and transmits the transmission request to the RF transmitting process unit 202. In addition, for example, in a case where the LF receiving process unit 201 receives the request signal transmitted from the vehicle 2, the signal generating unit 203 generates the response signal including the identification information unique to the electronic key 3 and transmits the transmission request to the RF transmitting process unit 202. As described above, the identification information unique to the electronic key 3 includes the ID which is the identifier unique to the electronic key 3, the "response", which is the result of decryption of the "challenge" included in the request signal that is performed by using the cryptographic key, or the like. The ID and the cryptographic key are registered (stored) in the storage unit 210 in advance. In addition, for example, in a case where the operation receiving unit 204 receives an activating operation (an example of a first operation) for activating the remote parking function through the operation unit 23, the signal generating unit 203 generates the activation signal and transmits the transmission request to the RF transmitting process unit 202. In addition, for example, in a case where the operation receiving unit 204 receives a moving operation (an example of a second operation) for moving (parking) the vehicle 2 via the remote parking function through the operation unit 23, the signal generating unit 203 generates the moving operation signal and transmits the transmission request to the RF transmitting process unit 202. In addition, for example, in a case where the operation receiving unit 204 receives an operation for terminating the remote parking function through the operation unit 23, the signal generating unit 203 generates the termination signal and transmits the transmission request to the RF transmitting process unit 202.

The operation receiving unit 204 receives various operations with respect to the operation unit 23 which are performed by the user based on a signal corresponding to the operation state that is input from the operation unit 23.

The LF receiving unit 21 includes a reception antenna and receives the LF-band radio wave (the LF signal) under control of the key ECU 20 (the LF receiving process unit 201).

The RF transmitting unit 22 includes a transmission antenna and transmits the RF-band radio wave (the RF signal) under control of the key ECU 20 (the RF transmitting process unit 202).

The operation unit 23 receives an operation input from the user which is for executing various functions of the electronic key 3. For example, the operation unit 23 may include three operation units that receive an operation for activating the remote parking function (the activating operation), an operation for executing the remote parking function (operating the vehicle driving device 15 such that the vehicle 2 moves) (the moving operation), and an operation for terminating the remote parking function (a terminating operation), respectively. In addition, the activating operation, the moving operation, and the terminating operation may be realized by different inputting methods (for example, an operation of pushing a button once, an operation of having a button remain pushed, an operation of pushing a button twice within a short period of time) with respect to one operation unit 23. In addition, the operation unit 23 may be realized by hardware, such as a button and a switch and may be realized by software, such as a button-like image displayed on a screen on a touch panel display.

Next, a process of realizing the remote parking function that is performed in the electronic key system 1 will be described with reference to FIGS. 3A and 3B, the description including the specific contents of a process performed by the restraining process unit 106.

Figure 3A:
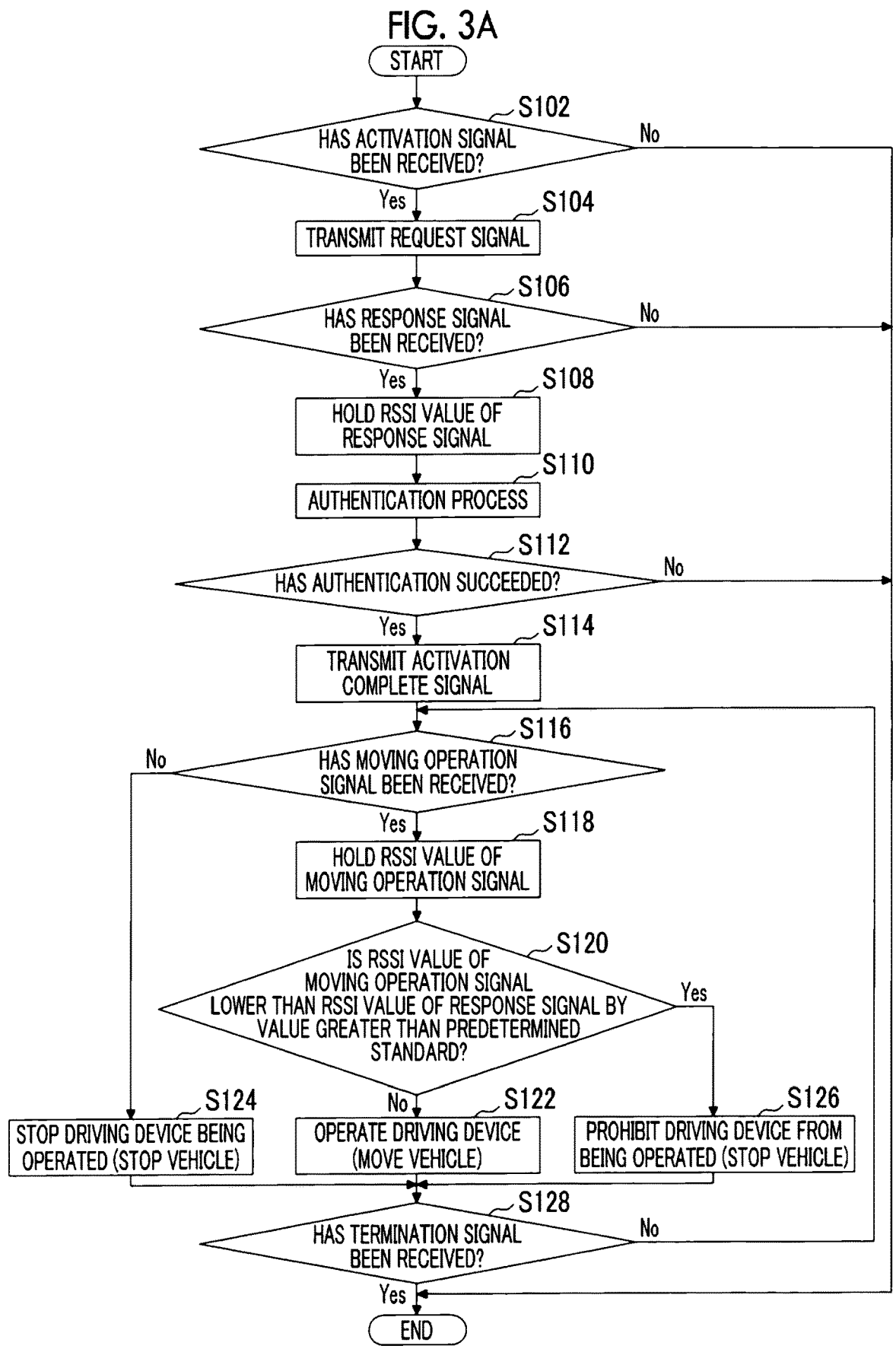
FIG. 3A is a flowchart schematically illustrating an example of a process corresponding to a remote parking function which is performed by a collation ECU.
Figure 3B:
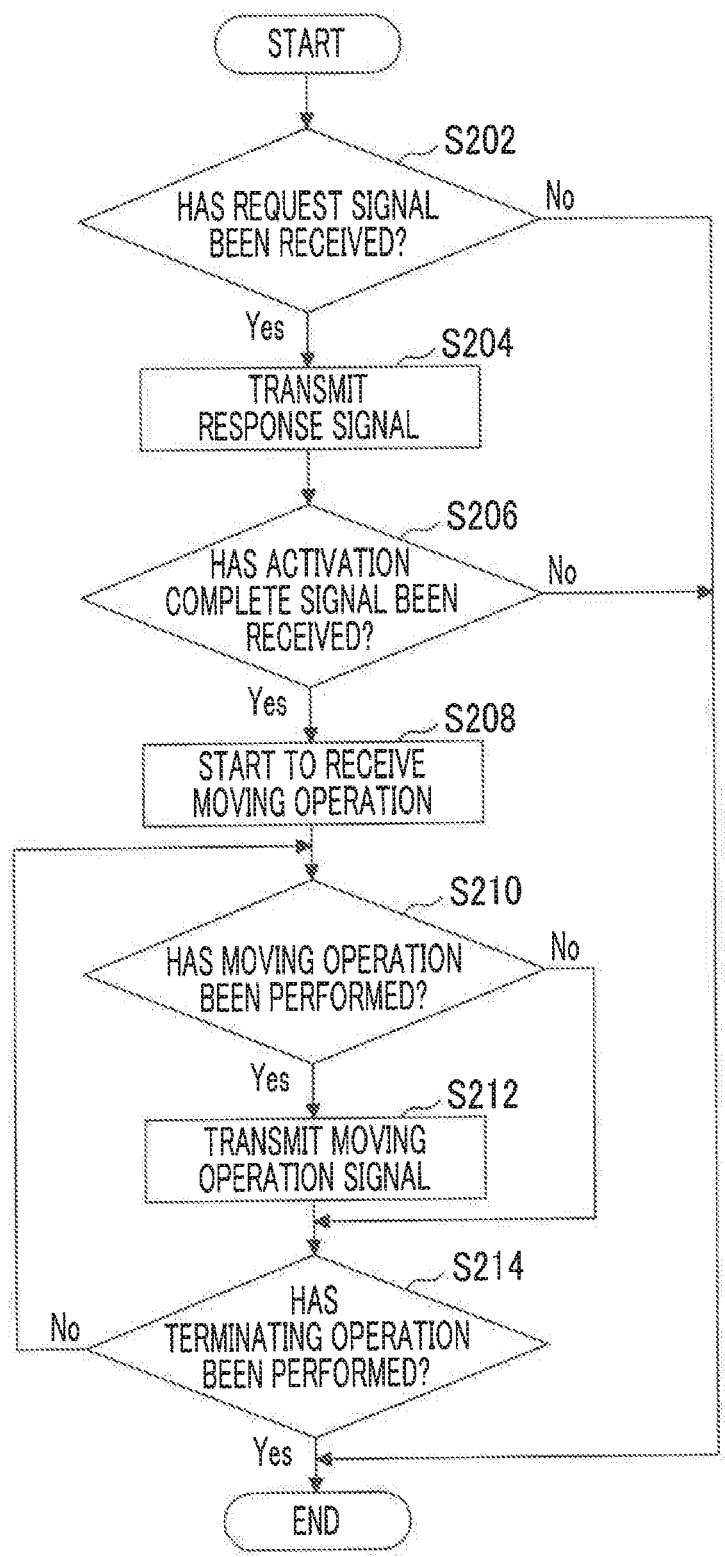
FIG. 3B is a flowchart schematically illustrating an example of a process corresponding to the remote parking function that is performed by a key ECU.

FIGS. 3A and 3B are flowcharts schematically illustrating an example of a process of realizing the remote parking function that is performed in the electronic key system 1. Specifically, FIG. 3A is a flowchart schematically illustrating an example of a process corresponding to the remote parking function that is performed by the vehicle 2 (the collation ECU 10) and FIG. 3B is a flowchart schematically illustrating an example of a process corresponding to the remote parking function that is performed by the electronic key 3 (the key ECU 20).

The process in the flowchart in FIG. 3A is repeated in a case where the vehicle 2 is in an IG-ON state and the user carrying the electronic key 3 has alighted from the vehicle (that is, the electronic key 3 has been moved out of the vehicle cabin). At this time, the collation ECU 10 can determine that the electronic key 3 has been removed from the vehicle cabin in a case where it is detected that a door has been closed after the response (the RF signal) from the electronic key 3 with respect to an LF signal from an LF transmitting unit (not shown) that transmits the LF-band radio wave over a space in the vehicle cabin is no longer detected after it is detected that the door has been opened. In addition, the process in the flowchart in FIG. 3B is started in a case where the activating operation is performed with respect to the operation unit 23 of the electronic key 3.

First, the process corresponding to the remote parking function that is performed by the collation ECU 10 will be described with reference to FIG. 3A.

In step S102, the RF receiving process unit 102 determines whether the activation signal (an example of a fourth signal) from the electronic key 3 has been received. In a case where the RF receiving process unit 102 determines that the activation signal from the electronic key 3 has been received, the RF receiving process unit 102 proceeds to step S104. Otherwise, the current process is terminated.

In step S104, the LF transmitting process unit 101 transmits the request signal (an example of a first signal) over the predetermined area outside the vehicle cabin. That is, the LF transmitting process unit 101 transmits the request signal at such a field intensity that the electronic key 3 can receive the request signal within the predetermined area outside the vehicle cabin.

In step S106, the RF receiving process unit 102 determines whether the response signal (an example of a second signal) from the electronic key 3 has been received within a predetermined period of time after the transmission of the request signal. In a case where the RF receiving process unit 102 determines that the response signal from the electronic key 3 has been received within the predetermined period of time, the RF receiving process unit 102 proceeds to step S108. Otherwise, the current process is terminated.

In step S108, the restraining process unit 106 holds the RSSI value input from the RSSI detecting circuit 13 of the response signal received by the RF receiving process unit 102 in a buffer of the RAM in the collation ECU 10, the storage unit 110, or the like.

In step S110, the authentication process unit 103 performs the authentication process of the electronic key 3 based on the response signal received by the RF receiving process unit 102.

In step S112, the authentication process unit 103 determines whether authentication of the electronic key 3 has succeeded or not. In a case where the authentication process unit 103 determines that the authentication of the electronic key 3 has succeeded, the authentication process unit 103 proceeds to step S114. In a case where the authentication process unit 103 determines that the authentication of the electronic key 3 has not succeeded, the current process is terminated.

In step S114, the LF transmitting process unit 101 transmits the activation complete signal over the predetermined area outside the vehicle cabin.

In step S116, the RF receiving process unit 102 determines whether the moving operation signal (an example of a third signal) from the electronic key 3 has been received. In a case where the RF receiving process unit 102 determines that the moving operation signal from the electronic key 3 has been received, the RF receiving process unit 102 proceeds to step S118. Otherwise, the RF receiving process unit 102 proceeds to step S24.

In step S118, the restraining process unit 106 holds the RSSI value of the moving operation signal that is input from the RSSI detecting circuit 13 and is received by the RF receiving process unit 102 in the buffer of the RAM in the collation ECU 10, or the storage unit 110.

In step S120, the restraining process unit 106 determines whether the RSSI value of the moving operation signal held in step S118 is lower than the RSSI value of the response signal held in step S108 by a value greater than a predetermined standard. For example, the restraining process unit 106 may determine that the above-described condition is satisfied in a case where a difference that is obtained when subtracting the RSSI value of the moving operation signal from the RSSI value of the response signal is equal to or greater than a predetermined threshold value (for example, 6 dB) (Yes in step S120). In addition, the restraining process unit 106 may determine that the condition is satisfied in a case where a ratio of the RSSI value of the moving operation signal to the RSSI value of the response signal is equal to or lower than a predetermined threshold value (for example, 0.7) (Yes in step S120). In a case where the condition is not satisfied (No in step S120), the restraining process unit 106 proceeds to step S122 and in a case where the condition is satisfied (Yes in step S120), the restraining process unit 106 proceeds to step S126.

In step S122, the drive control unit 104 controls the vehicle driving device 15 such that the vehicle 2 moves.

Meanwhile, in a case where the RF receiving process unit 102 determines that the moving operation signal from the electronic key 3 has not been received (No in step S116), in step S124, the drive control unit 104 stops the vehicle 2 and stops the vehicle driving device 15 being operated.

In addition, in a case where the RSSI value of the moving operation signal is lower than the RSSI value of the response signal by a value greater than the predetermined standard (Yes in step S120), in step S126, the restraining process unit 106 prohibits the vehicle driving device 15 from being operated through the drive control unit 104. Therefore, the drive control unit 104 stops the vehicle 2 and stops the vehicle driving device 15 being operated.

In step S126, the restraining process unit 106 may restrain the vehicle driving device 15 from being operated through the drive control unit 104 such that the speed of the vehicle 2 is decreased, restricted, or the like.

In step S128, the RF receiving process unit 102 determines whether the termination signal from the electronic key 3 has been received. In a case where the RF receiving process unit 102 determines that the termination signal from the electronic key 3 has not been received, the RF receiving process unit 102 returns to step S116 and the processes in step S116 to step S126 are repeated. In a case where the RF receiving process unit 102 determines that the termination signal from the electronic key 3 has been received, the current process is terminated.

Next, the process corresponding to the remote parking function that is performed by the key ECU 20 will be described with reference to FIG. 3B.

In step S202, the LF receiving process unit 201 determines whether the request signal from the vehicle 2 has been received. In a case where the LF receiving process unit 201 determines that the request signal from the vehicle 2 has been received, the LF receiving process unit 201 proceeds to step S204. Otherwise, the current process is terminated.

In step S204, the RF transmitting process unit 202 transmits the response signal to the vehicle 2.

In step S206, the LF receiving process unit 201 determines whether the activation complete signal from the vehicle 2 has been received within a predetermined period of time after the transmission of the response signal. In a case where the LF receiving process unit 201 determines that the activation complete signal from the vehicle 2 has been received within the predetermined period of time, the LF receiving process unit 201 proceeds to step S208. Otherwise, the current process is terminated.

In step S208, the operation receiving unit 204 starts to receive the moving operation through the operation unit 23.

In step S210, the operation receiving unit 204 determines whether the moving operation has been received through the operation unit 23. In a case where the operation receiving unit 204 determines that the moving operation has been received through the operation unit 23, the operation receiving unit 204 proceeds to step S212. Otherwise, the operation receiving unit 204 proceeds to step S214.

In step S212, the RF transmitting process unit 202 transmits the moving operation signal to the vehicle 2.

In step S214, the operation receiving unit 204 determines whether the terminating operation has been received through the operation unit 23. In a case where the operation receiving unit 204 determines that the terminating operation has not been received through the operation unit 23, the operation receiving unit 204 returns to step S210 and the processes in step S210 to step S214 are repeated. In a case where the operation receiving unit 204 determines that terminating operation has been received through the operation unit 23, the current process is terminated.

As described above, in the processes illustrated in FIGS. 3A and 3B, when the RF receiving process unit 102 receives the activation signal (an example of the fourth signal) corresponding to the activation operation (an example of the first operation) for activating the remote parking function which is performed with respect to the electronic key 3, the vehicle 2 (the LF transmitting process unit 101) transmits the request signal (an example of the first signal) over the predetermined area outside the vehicle cabin. After the electronic key 3 receives the request signal, the electronic key 3 (the RF transmitting process unit 202) transmits the response signal (an example of the second signal) to the vehicle 2 and the electronic key 3 (the RF transmitting process unit 202) transmits the moving operation signal (an example of the third signal) for operating the in-vehicle device (the vehicle driving device 15) to the vehicle 2 in a case where the moving operation (an example of the second operation) is performed with respect to the operation unit 23 after the response signal is transmitted. Since the wavelength of the LF-band radio wave is very long as described above, the LF-band radio wave is less likely to be influenced by the environment around the vehicle and the reachable range thereof hardly varies. Therefore, the vehicle 2 (the LF transmitting process unit 101) can transmit the LF signal such that the electronic key 3 can receive the LF signal within the predetermined area outside the vehicle cabin. Accordingly, the restraining process unit 106 can use the field intensity (the RSSI value) of the response signal (the second signal) received by the RF receiving process unit 102 as a standard value of a field intensity pertaining to a case where the electronic key 3 is present in the predetermined area around the vehicle 2 (in the vicinity of the vehicle). The restraining process unit 106 may determine that the distance between the electronic key 3 and the vehicle 2 is excessively great in a case where the field intensity of the moving operation signal (the third signal) received by the vehicle 2 (the RF receiving process unit 102) is lower than the field intensity of the response signal (the second signal) by a value greater than the predetermined standard. Therefore, the electronic key system 1 (the restraining process unit 106) can restrain or prohibit the in-vehicle device (the vehicle driving device 15) from being operated based on the moving operation signal. In addition, when the field intensity of the moving operation signal is compared with the field intensity of the response signal received by the vehicle 2 (the RF receiving process unit 102) in a case where the electronic key 3 is positioned relatively close to the vehicle 2 instead of using the absolute value of the field intensity of the moving operation signal received by the vehicle 2 (the RF receiving process unit 102), it is possible to determine the position of the electronic key 3 with relatively high accuracy. Therefore, it is possible to more appropriately restrain or prohibit the remote parking function which is activated with the vehicle driving device 15 being operated.

Next, a process of realizing the smart entry function that is performed in the electronic key system 1 will be described with reference to FIGS. 4A, 4B, 5, and 6, the description including the specific contents of a process performed by the restraining process unit 106.

Figure 4A:
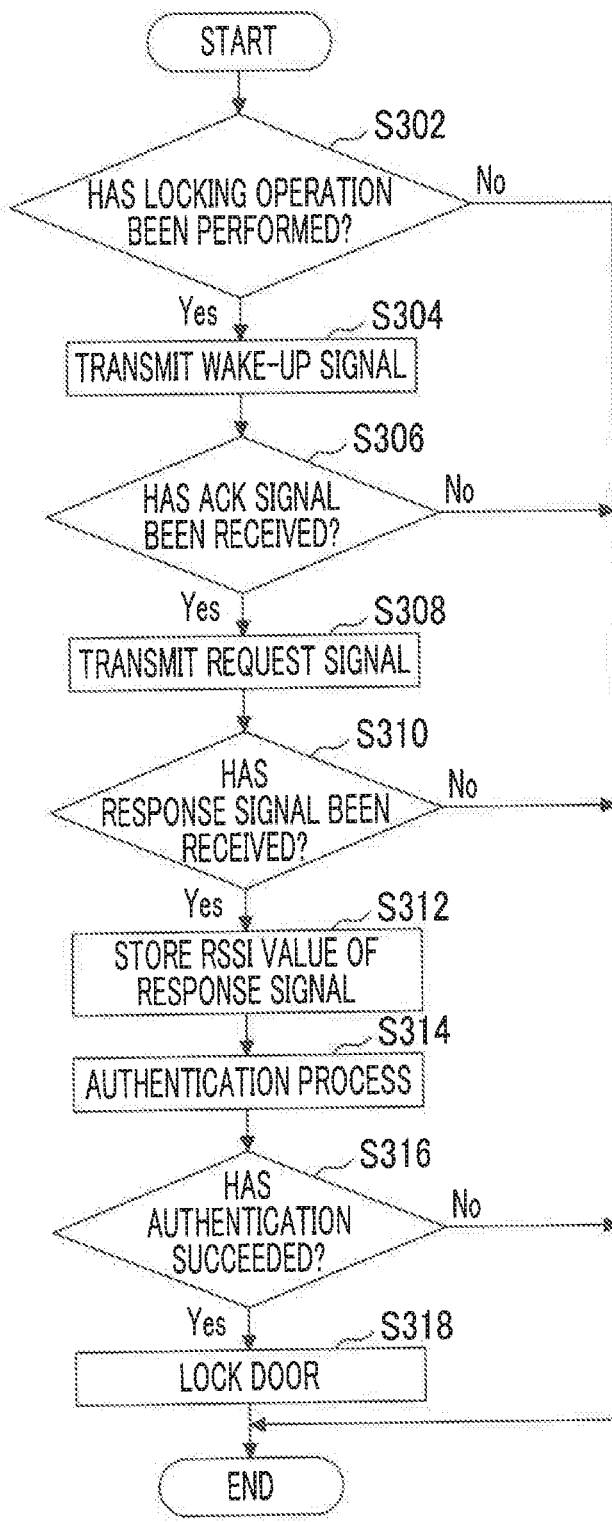
FIG. 4A is a flowchart schematically illustrating an example of a process corresponding to a smart locking function that is performed by the collation ECU.
Figure 4B:
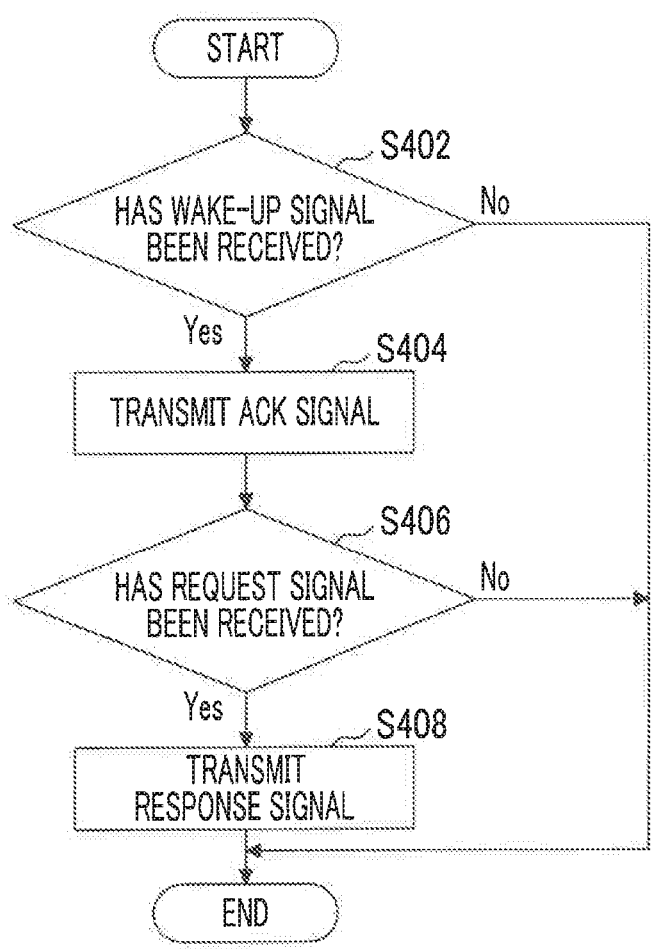
FIG. 4B is a flowchart schematically illustrating an example of a process corresponding to the smart locking function that is performed by the key ECU.
Figure 6:
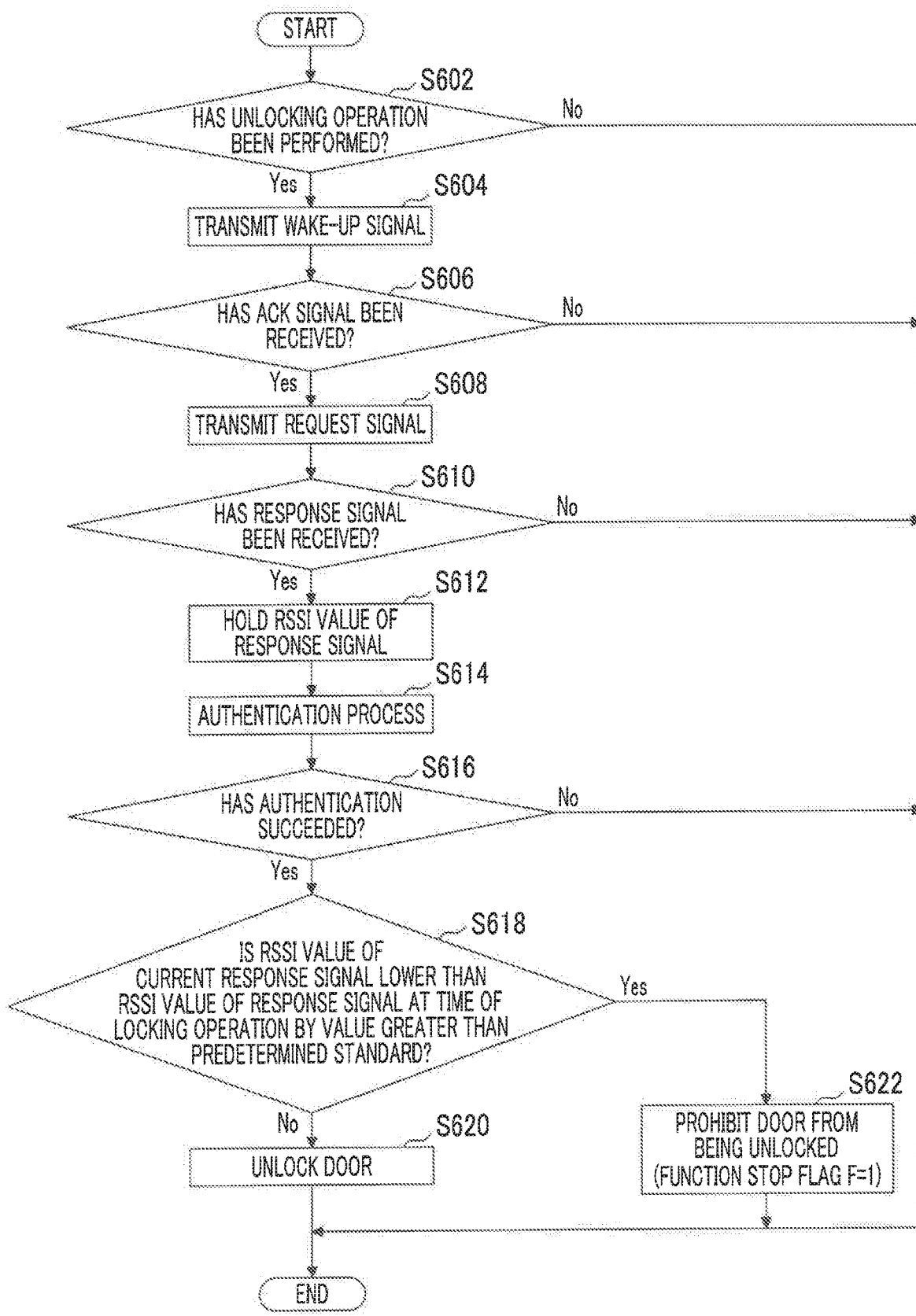
FIG. 6 is a flowchart schematically illustrating another example of a process corresponding to the smart unlocking function that is performed by the collation ECU.

FIGS. 4A and 4B are flowcharts schematically illustrating an example of a process of realizing the smart locking function that is performed in the electronic key system 1. Specifically, FIG. 4A is a flowchart schematically illustrating an example of a process corresponding to the smart locking function that is performed by the collation ECU 10 and FIG. 4B is a flowchart schematically illustrating an example of a process corresponding to the smart locking function that is performed by the key ECU 20. FIG. 5 is a flowchart schematically illustrating an example of a process corresponding to a smart unlocking function that is performed by the collation ECU 10. FIG. 6 is a flowchart schematically illustrating another example of a process corresponding to the smart unlocking function that is performed by the collation ECU 10.

The process in the flowchart in FIG. 4A is repeated at predetermined time intervals in a case where the vehicle 2 is in an IG-OFF state and all the doors are closed and unlocked. In addition, the process in the flowchart in FIG. 4B is repeated at predetermined time intervals in a case where the electronic key 3 is in the sleep state (the function of receiving the LF signal is not in the sleep state). In addition, the process in the flowchart in each of FIGS. 5 and 6 is repeated at predetermined time intervals in a case where the vehicle 2 is in the IG-OFF state, a door is locked, and a function stop flag F is "0".

The collation ECU 10 may perform one of the process in FIG. 5 and the process in FIG. 6 and may perform both the process in FIG. 5 and the process in FIG. 6 in parallel. In addition, the function stop flag F is a flag for prohibiting the smart unlocking function from being performed. The initial value of the function stop flag F is "0" and when the function stop flag F is set to "1" through a process (FIG. 5 or FIG. 6) that will be described later, the process in the flowchart is not performed, and thus the smart unlocking function is prohibited from being performed. The process corresponding to the smart unlocking function that is performed by the key ECU 20 is the same as the process corresponding to the smart locking function illustrated in FIG. 4B, and thus description thereof will be omitted. In addition, in a case where the electronic key 3 is woken up in the middle of the process illustrated in FIG. 4B, the electronic key 3 transitions into the sleep state after the process illustrated in FIG. 4B is terminated.

First, the process corresponding to the smart locking function that is performed by the collation ECU 10 will be described with reference to FIG. 4A.

In step S302, the LF transmitting process unit 101 determines whether the locking operation with respect to the locking and unlocking operation unit 14 has been performed. In a case where the LF transmitting process unit 101 determines that the locking operation with respect to the locking and unlocking operation unit 14 has been performed, the LF transmitting process unit 101 proceeds to step S304. Otherwise, the current process is terminated.

In step S304, the LF transmitting process unit 101 transmits the wake-up signal (another example of the first signal) over the predetermined area outside the vehicle cabin of the vehicle 2.

In step S306, the RF receiving process unit 102 determines whether the ACK signal from the electronic key 3 has been received within a predetermined period of time after the transmission of the wake-up signal. In a case where the RF receiving process unit 102 determines that the ACK signal from the electronic key 3 has been received within the predetermined period of time, the RF receiving process unit 102 proceeds to step S308. Otherwise, the current process is terminated.

In step S308, the LF transmitting process unit 101 transmits the request signal over the predetermined area outside the vehicle cabin of the vehicle 2.

In step S310, the RF receiving process unit 102 determines whether the response signal (another example of the second signal) from the electronic key 3 has been received within a predetermined period of time after the transmission of the request signal. In a case, where the RF receiving process unit 102 determines that the response signal from the electronic key 3 has been received within the predetermined period of time, the RF receiving process unit 102 proceeds to step S312. Otherwise, the current process is terminated.

In step S312, the restraining process unit 106 stores the RSSI value input from the RSSI detecting circuit 13 of the response signal received by the RF receiving process unit 102 in the storage unit 110.

The restraining process unit 106 may store the RSSI value of the ACK signal (still another example of the second signal) in the storage unit 110 instead of or along with the RSSI value of the response signal. In this case, a process corresponding to step S312 is performed between a process of step S306 and a process of step S308.

In step S314, the authentication process unit 103 performs the authentication process of the electronic key 3 based on the response signal received by the RF receiving process unit 102.

In step S316, the authentication process unit 103 determines whether authentication of the electronic key 3 has succeeded or not. In a case where the authentication process unit 103 determines that the authentication of the electronic key 3 has succeeded, the authentication process unit 103 proceeds to step S318. In a case where the authentication process unit 103 determines that the authentication of the electronic key 3 has not succeeded, the current process is terminated.

In step S318, the locking and unlocking control unit 105 transmits a locking command to the body ECU 16 such that the door of the vehicle 2 is locked and the current process is terminated.

Next, the process corresponding to the smart locking function that is performed by the key ECU 20 will be described with reference to FIG. 4B.

In step S402, the LF receiving process unit 201 determines whether the wake-up signal from the vehicle 2 has been received. In a case where the LF receiving process unit 201 determines that the wake-up signal from the vehicle 2 has been received, the LF receiving process unit 201 proceeds to step S404. Otherwise, the current process is terminated.

The electronic key 3 wakes up from the sleep state based on the received wake-up signal.

In step S404, the RF transmitting process unit 202 transmits the ACK signal to the vehicle 2.

In step S406, the LF receiving process unit 201 determines whether the request signal from the vehicle 2 has been received within a predetermined period of time after the transmission of the ACK signal. In a case where the LF receiving process unit 201 determines that the request signal from the vehicle 2 has been received within the predetermined period of time, the LF receiving process unit 201 proceeds to step S408. Otherwise, the current process is terminated.

In step S408, the RF transmitting process unit 202 transmits the response signal to the vehicle 2 and the current process is terminated.

In the present example (FIGS. 4A and 4B), the function of the wake-up signal may be combined with that of the request signal (still another example of the first signal) and the function of the ACK signal may be combined with that of the response signal (still another example of the second signal). In this case, the processes in steps S304, S306, S402, and S404 are omitted.

Next, an example of the process corresponding to the smart unlocking function will be described with reference to FIG. 5.

In step S502, the LF transmitting process unit 101 transmits the wake-up signal (an example of a fifth signal) as a polling signal over the predetermined area outside the vehicle cabin of the vehicle 2.

In step S504, the RF receiving process unit 102 determines whether the ACK signal from the electronic key 3 has been received within a predetermined period of time after the transmission of the wake-up signal. In a case where the RF receiving process unit 102 determines that the ACK signal from the electronic key 3 has been received within the predetermined period of time, the RF receiving process unit 102 proceeds to step S506. Otherwise, the current process is terminated.

In step S506, the LF transmitting process unit 101 transmits the request signal over the predetermined area outside the vehicle cabin of the vehicle 2.

In step S508, the RF receiving process unit 102 determines whether the response signal (another example of the third signal) from the electronic key 3 has been received within a predetermined period of time after the transmission of the request signal. In a case where the RF receiving process unit 102 determines that the response signal from the electronic key 3 has been received within the predetermined period of time, the RF receiving process unit 102 proceeds to step S510. Otherwise, the current process is terminated.

In step S510, the restraining process unit 106 holds the RSSI value input from the RSSI detecting circuit 13 of the response signal received by the RF receiving process unit 102 in a buffer of the RAM in the collation ECU 10, the storage unit 110, or the like.

The restraining process unit 106 may store the RSSI value of the ACK signal (still another example of the third signal) in the storage unit 110 instead of or along with the RSSI value of the response signal. In this case, a process corresponding to step S510 is performed between a process of step S504 and a process of step S506.

In step S512, the authentication process unit 103 performs the authentication process of the electronic key 3 based on the response signal received by the RF receiving process unit 102.

In step S514, the authentication process unit 103 determines whether authentication of the electronic key 3 has succeeded or not. In a case where the authentication process unit 103 determines that the authentication of the electronic key 3 has succeeded, the authentication process unit 103 proceeds to step S516. In a case the authentication process unit 103 determines that the authentication of the electronic key 3 has not succeeded, the current process is terminated.

In step S516, the restraining process unit 106 determines whether the RSSI value of the response signal (or the ACK signal) that is held in step S510 is lower than the RSSI value of the response signal (or the ACK signal) that is stored in the storage unit 110 after the previous smart locking function performing process (step S312) by a value greater than a predetermined standard. For example, the same predetermined standard as that in step S120 of FIG. 3A may be used. In a case where the above-described condition is not satisfied (No in step S516), the restraining process unit 106 proceeds to step S518 and in a case where the condition is satisfied (Yes in step S516), the restraining process unit 106 proceeds to step S522.

In step S518, the locking and unlocking control unit 105 determines whether the unlocking operation with respect to the locking and unlocking operation unit 14 has been performed within a predetermined period of time after the authentication of the electronic key 3 has succeeded. In a case where the locking and unlocking control unit 105 determines that the unlocking operation with respect to the locking and unlocking operation unit 14 has been performed within the predetermined period of time, the locking and unlocking control unit 105 proceeds to step S520. Otherwise, the current process is terminated.

In step S520, the locking and unlocking control unit 105 transmits an unlocking command to the body ECU 16 such that the door of the vehicle 2 is unlocked and the current process is terminated.

In a case where the RSSI value of the response signal (or the ACK signal) in the current smart locking function performing process is lower than the RSSI value of the response signal in the previous smart locking function performing process by a value greater than the predetermined standard (Yes in step S516), the restraining process unit 106 prohibits the door from being unlocked through the smart unlocking function in step S522 and the current process is terminated. Specifically, the restraining process unit 106 sets the function stop flag F to "1".

The function stop flag F may be initialized to "0" when a sufficient time (for example, several hours), within which a third party with malicious intent is assumed to have given up stealing the vehicle via the relay attack, elapses. Therefore, a period of time for which the smart unlocking function is prohibited becomes temporal, and thus it is possible to suppress a decrease in user convenience. In addition, the function stop flag F may be initialized to "0" in a case where the vehicle 2 (the collation ECU 10) receives an unlocking request signal that requests the unlocking of a door of the vehicle 2 via other means from the electronic key 3. This is because it is possible to determine that a possibility of vehicle theft through the relay attack is low in a case where the vehicle 2 receives an unlocking request signal that requests the unlocking of a door of the vehicle 2 via other means from the electronic key 3. Examples of the unlocking request signal that requests the unlocking of the door via other means include an unlocking request signal (an RF signal) that requests the unlocking of the door via a remote key entry function that uses the operation unit 23 of the electronic key 3 and an unlocking request signal that requests the unlocking of the door via a transponder communication function that uses a transponder of the electronic key 3. For the remote key entry function to be performed, the user needs to operate the operation unit 23 of the electronic key 3 and for the transponder communication function to be performed, the distance between the vehicle 2 and the electronic key 3 needs to be short. Therefore, it is possible to determine whether the user is intending to unlock the door of the vehicle 2. That is, it is possible to determine that a possibility of vehicle theft through the relay attack is low.

Next, another example of the process corresponding to the smart unlocking function will be described with reference to FIG. 6.

The process in FIG. 6 is the same as the process in FIG. 5 except for timing of determination on whether the unlocking operation with respect to the locking and unlocking operation unit 14 has been performed. Therefore, the following description will be made focusing on the difference between the process in FIG. 5 and the process in FIG. 6.

In step S602, the locking and unlocking control unit 105 determines whether the unlocking operation with respect to the locking and unlocking operation unit 14 has been performed. In a case where the locking and unlocking control unit 105 determines that the unlocking operation with respect to the locking and unlocking operation unit 14 has been performed, the locking and unlocking control unit 105 proceeds to step S604. Otherwise, the current process is terminated.

The processes in step S604 to step S622 are the same as the processes in step S502 to step S516, step S520, and step S522 in FIG. 5 and the same process as the process corresponding to the smart unlocking function illustrated in FIG. 5 is performed.

As described above, in the processes in FIGS. 4A, 4B, 5, and 6, at a time when the smart locking function is performed, the vehicle 2 (the LF transmitting process unit 101) transmits the wake-up signal and the request signal (still another example of the first signal) over the predetermined area outside the vehicle cabin. After the electronic key 3 receives the wake-up signal and the request signal, the electronic key 3 (the RF transmitting process unit 202) transmits the ACK signal and the response signal (still another example of the second signal) to the vehicle 2. Thereafter, the electronic key 3 (the RF transmitting process unit 202) transmits the ACK signal and the response signal (still another example of the third signal) for operating the unlocking device (the body ECU 16) based on the wake-up signal (another example of the fifth signal) from the electronic key 3 received by the LF receiving process unit 201 at the time of the next smart unlocking function performing process. Since the LF-band radio wave is less likely to be influenced by the environment around the vehicle 2, the vehicle 2 (the LF transmitting process unit 101) can transmit the LF signal such that the electronic key 3 can receive the LF signal within the predetermined area outside the vehicle cabin. Accordingly, at a time when the smart locking function is performed, the vehicle 2 (the restraining process unit 106) can use the field intensity (the RSSI value) of the response signal (the second signal) received by the RF receiving process unit 102 as a standard value of a field intensity pertaining to a case where the electronic key 3 is present in the predetermined area around the vehicle 2 (in the vicinity of the vehicle). In addition, at a time when the smart locking function is performed, the vehicle 2 (the restraining process unit 106) may determine that the distance between the electronic key 3 and the vehicle 2 is excessively great in a case where the field intensity of the ACK signal or the response signal (the third signal) received by the RF receiving process unit 102 is lower than the field intensity of the ACK signal or the response signal (the second signal) received by the RF receiving process unit 102 at the time of the previous smart locking function performing process by a value greater than the predetermined standard. Therefore, the vehicle 2 (the restraining process unit 106) can prohibit the in-vehicle device (the unlocking device) from being operated through the smart unlocking function. In addition, when the field intensity of the ACK signal or the response signal (the third signal) received by the vehicle 2 (the RF receiving process unit 102) at a time when the smart locking function is performed is compared with the field intensity of the ACK signal or the response signal (the second signal) received in a case where the electronic key 3 is positioned relatively close to the vehicle 2 instead of using the absolute value of the field intensity of the ACK signal or the response signal (the third signal) received by the vehicle 2 (the RF receiving process unit 102) at a time when the smart locking function is performed, it is possible to determine the position of the electronic key 3 with relatively high accuracy. Therefore, it is possible to more appropriately prohibit the in-vehicle device (the unlocking device) from being operated through the smart unlocking function. Therefore, in a case where there is a relay attack in which a third party with malicious intent relays the wake-up signal (the fifth signal) to the electronic key 3 that is positioned relatively far away from the vehicle 2 by using a repeater, the smart unlocking function is prohibited, and thus it is possible to suppress the vehicle theft through the relay attack.

Although the embodiments of the disclosure have been described above, the disclosure is not limited by the embodiments and various modifications and changes can be made without departing from the gist of the disclosure described in claims.

For example, the electronic key system 1 (the collation ECU 10) may operate an in-vehicle device other than the vehicle driving device 15 and the body ECU 16 (the unlocking device) based on bidirectional communication between the vehicle 2 and the electronic key 3. For example, the electronic key system 1 (the collation ECU 10) may operate a power window device based on a window opening signal or a window closing signal which is transmitted from the electronic key 3 (the RF transmitting process unit 202) to the vehicle 2 corresponding to a predetermined operation (a window opening operation or a window closing operation) performed with respect to the operation unit 23 of the electronic key 3. In this case, the user can open a side window such that the vehicle cabin is ventilated before boarding the vehicle when the vehicle 2 is in a parked state (the IG-OFF state) and can close a side window that the user has forgotten to close after the vehicle 2 is parked. In this case, the above-described function may be realized by a process in which the "moving operation signal" in the processes in FIGS. 3A and 3B have been substituted with the "window opening signal" or the "window closing signal". In this case, it is possible to restrain or prohibit the power window device from being operated in a case where the distance between the user carrying the electronic key 3 and the vehicle 2 is excessively great. Therefore, it is possible to suppress a decrease in safety or security which occurs if the power window device is operated in a state where it is difficult to figure out the state of the vehicle 2 or the state of the vicinity of the vehicle 2.

What is claimed is:

1. A vehicle control system in which an in-vehicle device installed in a vehicle is operated based on bidirectional communication between the vehicle and a portable device, the vehicle control system comprising:

a first transmitter that transmits a predetermined first signal over a predetermined area outside a vehicle cabin through an LF-band radio wave (LF being a low frequency), the first transmitter being provided in the vehicle;

a first receiver that receives a signal transmitted from the portable device through an RF-band radio wave (RF being a radio frequency), the first receiver being provided in the vehicle;

a detecting circuit that detects a field intensity of the signal received by the first receiver, the detecting circuit provided in the vehicle;

a second receiver that receives the predetermined first signal transmitted from the vehicle through the LF-band radio wave, the second receiver provided in the portable device;

a second transmitter that transmits the signal to the vehicle through the RF-band radio wave, the second transmitter provided in the portable device, the second transmitter transmits a predetermined third signal to the vehicle through the RF-band radio wave after transmitting a predetermined second signal to the vehicle through the RF-band radio wave when the second receiver receives the first signal;

an electronic control unit that operates the in-vehicle device based on the third signal received by the first receiver, the electronic control unit provided in the vehicle, the electronic control unit configured to function as a restraint unit that restrains or prohibits the in-vehicle device from being operated by the electronic control unit based on the third signal when a field intensity of the third signal detected by the detecting circuit is lower than a field intensity of the second signal detected by the detecting circuit by a value greater than a predetermined standard, wherein:

the first transmitter transmits the first signal over the predetermined area outside the vehicle cabin through the LF-band radio wave when the first receiver receives a predetermined fourth signal transmitted from the portable device, the second transmitter transmits the fourth signal to the vehicle through the RF-band radio wave when a first operation for starting a function of operating the in-vehicle device comprising a vehicle driving device is performed with respect to an operation unit of the portable device, transmits the second signal to the vehicle through the RF-band radio wave when the second receiver receives the first signal, and transmits the third signal to the vehicle through the RF-band radio wave when a second operation for operating the vehicle driving device is performed with respect to the operation unit after the second signal is transmitted to the vehicle, and the electronic control unit operates the vehicle driving device based on the third signal received by the first receiver to move the vehicle.

2. The vehicle control system according to claim 1, wherein the first signal is a request signal with respect to the portable device, the second signal is a response signal with respect to the first signal, and the third signal is a moving operation signal which is a trigger for performing a remote parking function.

\* \* \* \* \*